United States Patent
Duplys et al.

(10) Patent No.: US 9,832,014 B2
(45) Date of Patent: Nov. 28, 2017

(54) SYMMETRICAL ITERATED BLOCK ENCRYPTION METHOD AND CORRESPONDING APPARATUS

(71) Applicant: Robert Bosch GmbH, Stuttgart (DE)

(72) Inventors: Paulius Duplys, Markgroeningen (DE); Sebastien Leger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 188 days.

(21) Appl. No.: 14/824,424

(22) Filed: Aug. 12, 2015

(65) Prior Publication Data

US 2016/0056955 A1 Feb. 25, 2016

(30) Foreign Application Priority Data

Aug. 19, 2014 (DE) .................. 10 2014 216 392

(51) Int. Cl.
*H04L 9/06* (2006.01)
*H04L 9/00* (2006.01)

(52) U.S. Cl.
CPC ............ *H04L 9/0625* (2013.01); *H04L 9/002* (2013.01); *H04L 9/0631* (2013.01)

(58) Field of Classification Search
CPC ............... H04L 2209/12; H04L 9/0625; H04L 2209/125; H04L 2209/24; H04L 9/0631; H04L 9/002
See application file for complete search history.

(56) References Cited

U.S. PATENT DOCUMENTS

| | | | | |
|---|---|---|---|---|
| 8,155,308 B1* | 4/2012 | Poo | ...................... | H04L 9/0631 380/29 |
| 8,290,148 B2* | 10/2012 | Akishita | ................. | H04L 9/002 380/28 |
| 8,300,805 B1* | 10/2012 | Langhammer | ........ | H04L 9/0631 380/28 |
| 8,379,841 B2* | 2/2013 | Taylor | .................. | H04L 9/0662 380/28 |
| 2003/0068036 A1* | 4/2003 | Macchetti | ............ | H04L 9/0631 380/29 |
| 2004/0174994 A1* | 9/2004 | Jiraki | ....................... | H04L 9/34 380/28 |
| 2004/0202317 A1* | 10/2004 | Demjanenko | ......... | H04L 9/0631 380/28 |
| 2005/0213756 A1* | 9/2005 | Hubert | .................. | H04L 9/0631 380/44 |
| 2006/0177052 A1* | 8/2006 | Hubert | .................... | H04L 9/003 380/29 |
| 2007/0036353 A1* | 2/2007 | Reznik | ................. | H04B 7/0434 380/30 |
| 2010/0115286 A1* | 5/2010 | Hawkes | ............. | G06F 12/1408 713/189 |
| 2010/0142702 A1* | 6/2010 | Wolf | ..................... | H04L 9/0625 380/29 |
| 2014/0348323 A1* | 11/2014 | Chevallier-Mames | . | H04L 9/002 380/28 |

* cited by examiner

*Primary Examiner* — Yonas Bayou
(74) *Attorney, Agent, or Firm* — Norton Rose Fulbright US LLP; Gerard Messina

(57) ABSTRACT

A symmetrical iterated block encryption method includes: a bitwise XOR combination of a predetermined data word of a predetermined block with a predetermined data word of a predetermined round key; and a bitwise XOR combination of the predetermined data word with at least one other predetermined data word.

14 Claims, 3 Drawing Sheets

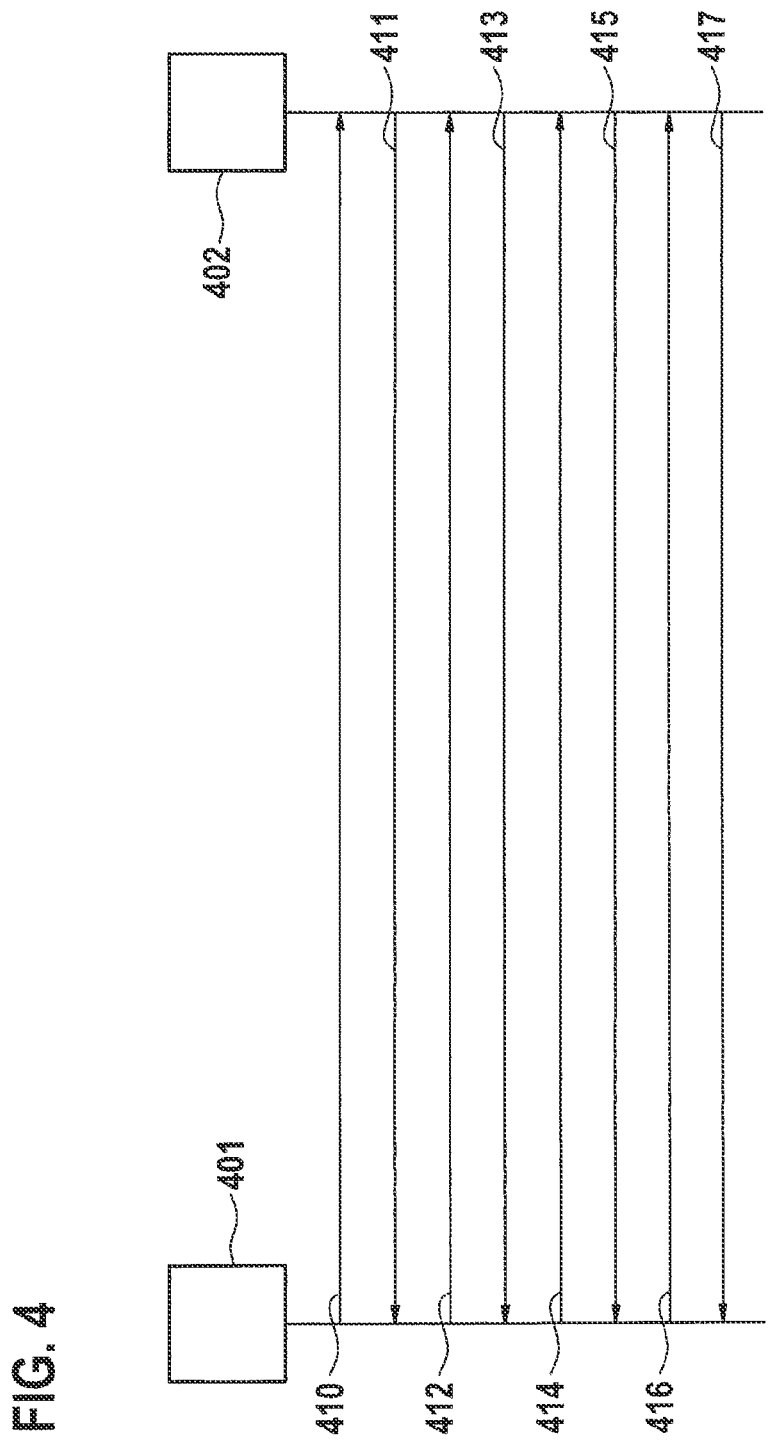

SYMMETRICAL ITERATED BLOCK ENCRYPTION METHOD AND CORRESPONDING APPARATUS

BACKGROUND OF THE INVENTION

1. Field of the Invention

The present invention relates to symmetrical iterated block encryption method and a device for implementing the method.

2. Description of the Related Art

Modern block encryption methods, such as the Advanced Encryption Standard (AES), are designed as iterated block ciphers. This means that processing of the input encompasses multiple rounds that are configured identically. The data to be encoded are divided into individual blocks of fixed length that are then mapped, by way of a transformation determined by a key, onto encoded values. The ciphertext blocks produced thereby also have fixed lengths.

A block cipher is a function that maps a cleartext onto an encoded text. This function is injective for every possible key, so that a decoding function exists which calculates the cleartext again for every encoded text.

Selection of the block cipher and of the key are of great interest. For certain cryptological methods it has been possible, by observing a cryptographic device as it executes the corresponding cryptological algorithms, to find correlations between the observed data and the key being used. Conclusions as to the key being used are thereby possible, and can ultimately cause the cryptographic method to be compromised.

For example, it is possible by way of side-channel attacks such as so-called differential power analysis, by measuring the energy consumption of a microprocessor during cryptographic calculations, to draw conclusions as to the operations being performed and thus as to the key being used.

Countermeasures against such side-channel attacks have already been proposed, and can be divided into the following groups:

Countermeasures at the cell level, i.e. modifying the implementation of the logic gates or analog components of the microprocessor, in order to influence the physical properties of the electronic circuit in such a way that the information regarding energy consumption is not measurable, or is measurable only with difficulty, for side-channel attacks.

Modifications to the implementation of a logic of a cryptographic algorithm on standard CMOS cells, which attempt to conceal or mask the information regarding energy consumption which is necessary for physical analysis in order thereby to prevent an analysis of the run time of the algorithm.

BRIEF SUMMARY OF THE INVENTION

The method and the apparatus according to the present invention have the advantage that in the context of an implementation in hardware, e.g. in an application-specific integrated circuit (ASIC) or field programmable gate array (FPGA), comparatively little processor area is required, and in the context of an implementation in software lesser demands are placed on standard CMOS cells in terms of calculation time and memory usage. A favorable solution that offers sufficient protection from side-channel attacks is thereby achieved.

It is particularly advantageous if only the first and the last round of the iterated block encryption method encompass the bitwise XOR combination of the block with at least one other byte. With an implementation in the microprocessor this saves area, and with an implementation in software it saves calculation time and memory space.

It is particularly advantageous if, for a plurality of the bytes obtained from the bitwise XOR combinations, a plurality of values from a substitution box is identified. The countermeasure against side-channel attacks is thereby improved by the fact that as many as possible of, or in fact all, the key candidates, i.e. all possible values of a byte, are employed for calculation. As a result it is difficult to correlate the measured energy consumption with the correct key. Each of the calculated values thereby leads back to a possible key of the iterated block encryption method. All the keys obtainable via a side-channel attack are thus plausible. It is therefore largely impossible to recognize the correct key from the plurality of plausible keys.

Preferably the identification of the bitwise XOR combination, or of the value from the substitution box, is accomplished for at least two of the aforesaid bytes successively. With an implementation in software, where calculation cannot occur arbitrarily in parallel, identification of the correct key thus remains largely impossible, since all the keys recognized as plausible for each round are calculated successively, and it remains unclear which of the plausible keys is the correct one.

It is particularly advantageous if a memory access to a table mapping the substitution box is accomplished substantially simultaneously for at least two values. For a solution implemented in software, a reliable conclusion regarding the correct key is thus not possible even by observing the energy consumption of a data bus connecting the processor to the memory, since it is only possible to infer plausible keys from all the data contained in the memory access.

It is particularly advantageous if the identification of the bitwise XOR combinations or of the value from the substitution box is accomplished substantially simultaneously for at least two of the aforesaid bytes. With an implementation in an ASIC or FPGA, the association of the energy consumption with the key thus cannot be reliably inferred from the energy consumption of the ASIC or FPGA.

Exemplifying embodiments of the invention are depicted in the drawings and will be explained in further detail in the description that follows.

BRIEF DESCRIPTION OF THE DRAWINGS

FIG. 4 is a flow chart of a method in which a memory access to a table mapping the S-box occurs substantially simultaneously for at least two values.

DETAILED DESCRIPTION OF THE INVENTION

Figure 1:
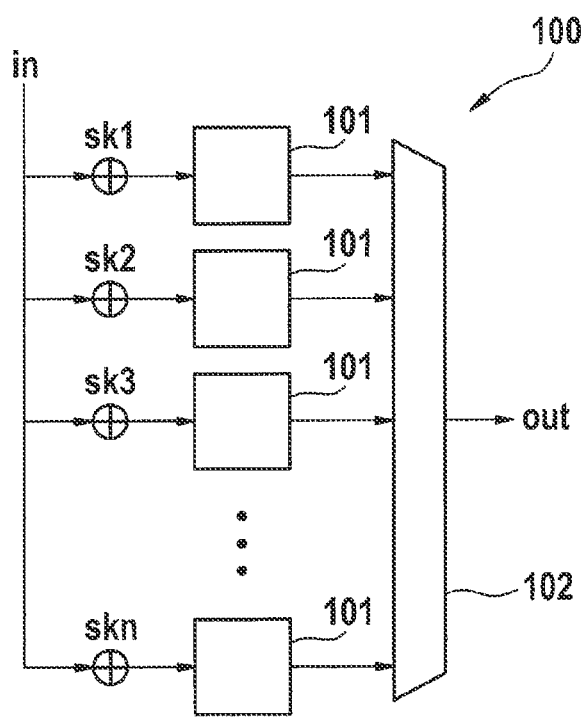
FIG. 1 shows a first embodiment of the present invention embodied as an ASIC, in which the symmetrical iterated block encryption is implemented.

Examples of the symmetrical iterated encryption process will be described below. They encompass a bitwise XOR combination of a predetermined data word with a key, and at least one further bitwise XOR combination of the predetermined data word with at least one further key.

The examples furthermore encompass a nonlinear substitution operation that is accomplished in accordance with a substitution box (S-box). The nonlinear substitution operation is, for example, a mapping of a data word onto another data word of the same length. The S-box is expressed, for example, in accordance with the Advanced Encryption Standard. Alternatively, an S-box according to the PRESENT block encryption method can also be used. Any other S-box suitable for symmetrical iterated block encryption methods, for example a Rijndael S-box, can likewise be used.

The example of symmetrical iterated encryption using AES will be described below. The AES procedure is modified in order to perform further XOR combinations and mappings in accordance with an S-box.

Implementation is accomplished either via hardware in the ASIC or FPGA, or as software. The blocks and tables mentioned below, as well as signal paths, are accordingly either mapped in hardware or implemented as software.

AES allows predetermined key lengths and block lengths of, for example, 128 bits, 192 bits, and 256 bits. AES 256, having a user key with a length of 256 bits, is used in the example.

To begin with, the cleartext to be encoded is written into a block having one of the aforesaid lengths; if applicable, longer cleartext is subdivided into multiple cleartext blocks to be processed successively. Each block corresponds to the aforesaid predetermined data word and is firstly written into a two-dimensional table having four rows, each of whose cells is one byte in size. For a 256-bit long block, for example, a table having four rows and eight columns is generated.

Each block is successively subjected to specific transformations. These are only roughly sketched out below, since the details are known from the AES standard.

Encoding via AES is accomplished by performing a key expansion, a pre-round, multiple encoding rounds, and a last round. The four transformations in this context are SubBytes, ShiftRows, MixColumns, and AddRoundKey.

This procedure and the transformations are implemented either as software code or in hardware in an ASIC or FPGA.

In the transformations, AES applies various parts of an expanded original key to the block. These various parts are hereinafter referred to as "round keys." The number of rounds varies, and in AES depends only on the key length. For AES 256 with the block length of 256, for example, 14 rounds are carried out.

The expanded original key is identified from the user key in the key expansion step, by expansion to the appropriate length. It is identified in such a way that each round key has the same length as the block. In AES 256 each round key is thus 256 bits long.

After key expansion the pre-round occurs, in which the AddRoundKey transformation is performed for the first time. The AddRoundKey transformation contains, in the pre-round, a bitwise XOR combination between the block and the first round key. This means that a predetermined data word is bitwise XOR-combined with a key. Each byte of the block can also be successively XOR-combined with the corresponding byte of the first round key. In this case the bitwise XOR combination of each of the bytes is performed.

In addition, in a departure from the usual AES encryption method, at least one further bitwise XOR combination of the block with a further data word of the same length as the first round key is performed. Preferably each byte of the further data word is different from the respective byte of the first round key. Preferably several of these further data words are applied, in further bitwise XOR combinations, to the predetermined data word. The greater the number of other data words that are used, the more successively executing or parallel transformations are available.

The bytes of the further data words can be selected, for example, in such a way that they represent all other possible values of a byte except for the respective byte of the first round key. All that an attacker can then discover by way of a side-channel attack, from the totality of the bitwise XOR combinations for all bytes, is multiple parts recognizable as plausible in terms of a hypothesis for the correct key.

The result of each of these bitwise XOR combinations is stored in the memory in separate blocks, or a hardware path for further processing is provided for each of the results.

The correct block or hardware path is marked as a function of the actual user key. For example, a base address for the correct block is stored in memory, or the correct hardware path is stored.

The first of the encoding rounds then follows.

In the first step of each encoding round, the SubByte transformation is performed: for each byte of all the blocks, an equivalent is looked for in the S-box.

Each byte of each block to which the SubBytes transformation is applied is mapped onto a byte at the output by way of the aforementioned S-box, for example a table in memory or a functional block implemented in hardware.

The result is stored in the respective block, or is further utilized via a corresponding hardware path.

The ShiftRows transformation is then performed for all blocks. Each block is present in the form of a two-dimensional table having four rows. The rows of the table are shifted to the left a specific number of columns in accordance with the AES specification. Overflowing cells are continued from the right.

The result is again stored in the respective block, or is further utilized via a corresponding hardware path.

The MixColumns transformation is then performed. Here the data within the columns are mixed using a reversible linear transformation in accordance with the AES specification.

The result is again stored in the respective block, or is further utilized via a corresponding hardware path.

The bitwise XOR combination between the block identified by way of the base address as the correct block, and the next round key, is then performed by way of the AddRoundKey transformation. The other blocks are XOR-combined with further data words having the same length as the next round key. These are preferably different from the respective byte of the round key. For example, all other possible values of a byte except for the respective byte of the current round key are used. Alternatively, this step can be omitted from the iterated encoding rounds and can be provided only in the AddRoundKey transformation of the last round. This reduces memory and calculation outlay, or area utilization on the microprocessor.

The result is again stored in the respective block, or is further utilized via a corresponding hardware path, and the next encoding round follows.

After all the encoding rounds are complete, in the example after 14 rounds, a last round is carried out. In this only the SubBytes, ShiftRows, and AddRoundKey transformations, as described, are carried out.

The result, i.e. the encoded text, is then stored back in the respective block or is available via a corresponding hardware path. The correct result can be discovered on the basis of the base address and is correspondingly outputted.

The same correspondingly applies to encoding using the PRESENT encryption method. In other words, the XOR combination and the mapping via S-box occur at a corresponding point in accordance with the specifications of the PRESENT encryption method.

FIG. 1 shows a first embodiment in which the symmetrical iterated block encryption method is embodied in an ASIC. FIG. 1 schematically depicts part of an integrated circuit 100.

Integrated circuit 100 encompasses an input "in" that is connected to multiple XOR elements. These XOR elements are labeled ⊕ in FIG. 1.

Each of the XOR elements is connected on the output side to a functional block 101. Functional blocks 101 are connected on the output side to a multiplexer 102 that is embodied to switch the output of one of these functional blocks 101 to an output "out" of integrated circuit 100. Each of the XOR elements possesses a second input at which one of the keys sk1, sk2, sk3, . . . , skn is applied. These are selected, as described above, in such a way that at least one of the keys sk1, sk2, sk3, . . . , skn is the current round key. The others can be selected arbitrarily, preferably as described above.

Input "in", multiplier 102, the XOR elements, output "out", and the connections are designed for data words of a predetermined length.

In the AES 256 example with a block length of 256 bits, this predetermined length is 256 bits. The key length is based on the encryption method being used. With AES 256 a key length of 256 bits is used.

The input of each functional block 101 is identified by way of the XOR element, by bitwise XOR combination of the predefined data word at input "in" with a respective predetermined key sk1, . . . , skn.

Each functional block 101 then maps the data word at its input onto a data word at its output. With the S-box according to AES 256, the data word is mapped bytewise onto the output.

The bitwise XOR combinations can also be carried out successively for parts of the keys. For example, for each byte a predetermined data word is XOR combined with all the keys sk1, . . . , skn.

The output of the XOR combination is then delivered bytewise to the respective functional blocks 101.

For an individual byte of a round key, 256 different values are possible. With bytewise processing, for example, provision is made for 256 functional blocks 101 and 256 bitwise XOR elements.

This means that in this case electronic circuit 100 carries out the bitwise XOR combination simultaneously or at least approximately simultaneously for every possible value of a byte of the round key. Also in this case, the mapping by functional blocks 101 for 256 possible round keys is calculated simultaneously or approximately simultaneously in electronic circuit 100.

In each of the cases recited, multiplexer 102 is embodied to select, from all the values at the output of the respective functional blocks 101, the value belonging to the correct round key. For example, multiplexer 102 switches to output "output" that data word which is identified by the base address belonging to the correct round key.

Electronic circuit 100 contains for this purpose, for example, a finite state machine (not shown in FIG. 1) that is mapped in electronic circuit 100 and that switches multiplexer 102 in such a way that what is outputted at the output is the value of functional block 101 that has performed the operation with the correct round key.

If encoding in accordance with the PRESENT block encryption method is used, the substitution box encompasses an input four bits in size, so that only 16 substitution boxes are needed for this encryption method. In this case therefore 16 XOR combinations, or 16 values at the output of the respective functional blocks, are calculated substantially simultaneously.

The result is that once an attacker has collected sufficient information regarding the energy consumption of the electronic circuit, he or she cannot achieve an unambiguous result using a hypothesis with regard to the value of the round key byte, since each byte of the round key appears plausible in terms of the hypothesis.

A method for symmetrical iterative block encryption accordingly encompasses a bitwise XOR combination of a predetermined data word of a predetermined block with a predetermined data word of a predetermined round key, and a bitwise XOR combination of the predetermined data word with at least one other predetermined data word.

The symmetrically iterated block encryption method correspondingly preferably contains a mapping of the result of the bitwise XOR combinations by way of a substitution box onto a data word at the respective output of the functional block. From these data words, the data word attributable to the part of the round key is then selected by way of the multiplexer for the output of integrated circuit 100.

If the calculation is accomplished bytewise, the symmetrically iterated block encryption method contains a bitwise XOR combination of a predetermined byte of a predetermined block with a predetermined byte of a predetermined round key, and a bitwise XOR combination of the predetermined byte with at least one other predetermined byte.

In the case of PRESENT, block encryption contains a bitwise XOR combination of a 4-bit data word at the input with a 4-bit wide round key.

A method for symmetrical iterated block encryption, for example implemented as software that can execute on a standard processor 201, will be described below with reference to FIG. 2. According to FIG. 2, processor 201 is embodied to communicate with a memory 202 via a data bus. This data bus is not depicted in FIG. 2, but for an attacker who wishes to discover the key for the block encryption method being used, it offers the possibility of drawing conclusions, from the energy consumption caused by the memory accesses, as to the key being used.

In this case memory 202 contains a table mapping the S-box. By way of this table, a data word of predefined word width is mapped onto another data word of predefined word width. The substitution table is designed in accordance with the block encryption algorithm being used.

Figure 2:
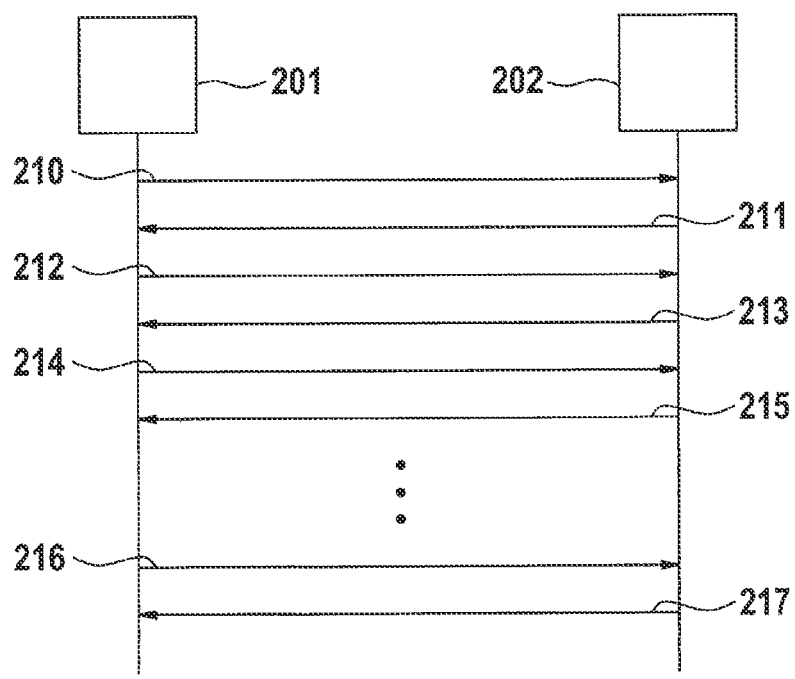
FIG. 2 is a flow chart of a method for symmetrical iterated block encryption.

In the example of FIG. 2, processor 201 is embodied to carry out memory accesses. The individual values of the table are stored in memory, for example, at a specific distance from the base address. This base address is freely selectable. The distance from the base address is defined, for example, by the possible values of the bitwise XOR operation on the data words.

The read access is sent, for example, from processor 101 to memory 202 via the data bus by way of requests 210, 212, 214, 216. For example, processor 201 sends the base address and the result of the bitwise XOR combination to the memory in the request. Request 210 contains, for example, a request for the result of the mapping of the predetermined data word XOR-combined with the key sk1. This is represented, for example, by a string "read@baseaddress+(in⊕sk1)". The further requests 212, 214, and 216 are represented, for example, by the strings "read@baseaddress+(in⊕sk2)", "read@baseaddress+(in⊕sk1)", . . . , "read@baseaddress+(in⊕skn)". In general, the number of read accesses accomplished is the same as the number of further data words provided.

After the request is received, memory 202 sends the respectively requested data back in a respective response 211, 213, 215, 217. As depicted in FIG. 2, requests 210, 212, 214, 216 and the respective responses 211, 213, 215, 217 occur chronologically successively. In other words, the value from the S-box occurs for at least two of the aforesaid data words in succession.

In the AES 256 example, for example, the request is made 256 times, so that all possible values of the S-box are requested. In this case memory 202 also sends 256 responses, which contain all possible values of the S-box, to processor 201.

In this case processor 201 is embodied to continue with further calculation of the block encryption using only the response that was made to the request having the correct part of the round key. Provision is made for this purpose, for example, to correspondingly mark the response belonging to the correct part of the round key. This is done, for example, by reutilizing the received value that belongs to the marked base address, whereas all other received values are not reutilized.

Implementation in accordance with PRESENT block encryption is accomplished correspondingly. The 4-bit word width is again used here. This reduces the memory requirement in memory 202.

Figure 3:
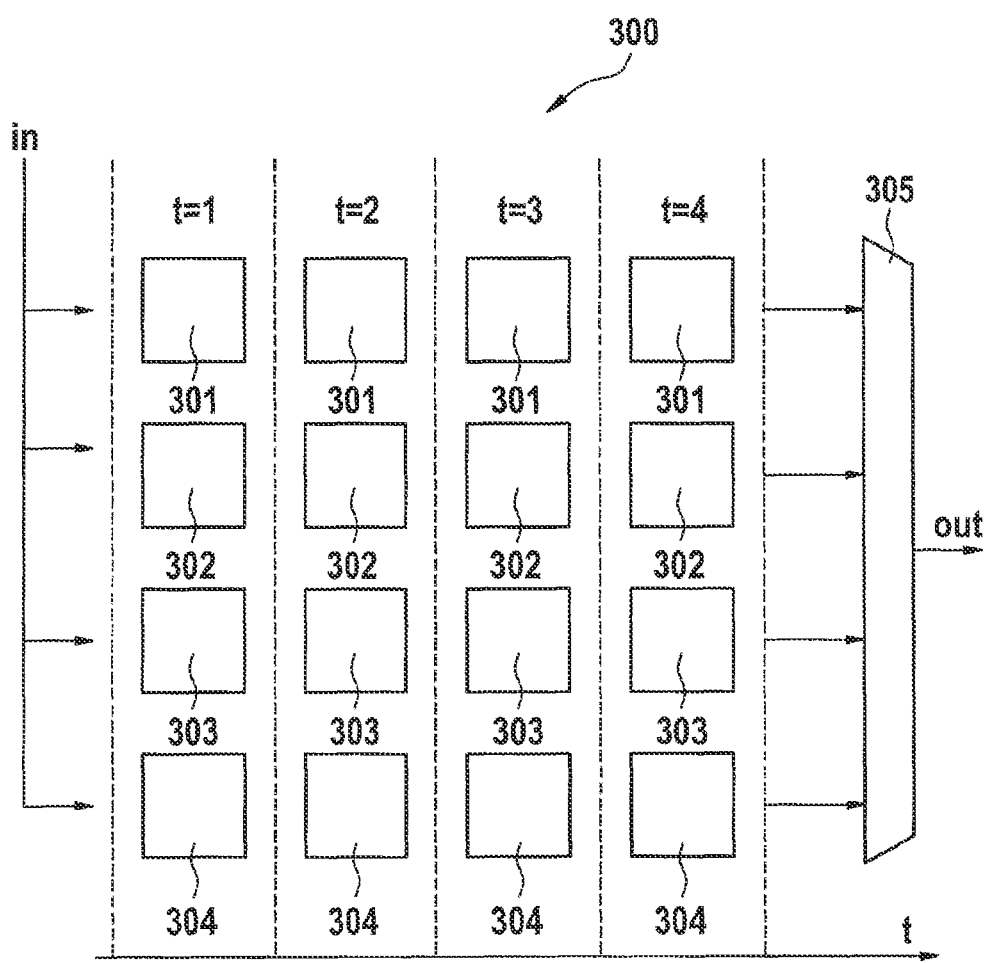
FIG. 3 schematically shows an implementation of PRESENT block encryption with 16 input values.

FIG. 3 shows an implementation of PRESENT block encryption with 16 input values, which has only four functional boxes 301, 302, 303, 304. As schematically depicted in FIG. 3, integrated circuit 300 contains an input "in" and an output "out" that correspond to the input "in" and output "out" previously described with reference to FIG. 1. Integrated circuit 300 furthermore encompasses a multiplexer 305 that corresponds to multiplexer 102 and has control correspondingly applied to it in order to select the correct output value.

In contrast to integrated circuit 100 of FIG. 1, integrated circuit 300 according to FIG. 3 encompasses only four functional blocks 301, 302, 303, 304. These functional blocks 301, 302, 303, 304 encompass the S-box as described for the PRESENT block encryption method.

Similarly to what was described regarding FIG. 1, with the PRESENT block encryption method a data word, having a 4-bit word width, of the block having a part of the round key is combined by way of an XOR element (not depicted in FIG. 3) in such a way that a bitwise XOR combination is produced. The corresponding XOR combinations with the data word of the block are constituted in the same way for all other possible values of a data word having a 4-bit word width. Unlike in the procedure described previously, in a first cycle t=1 the mapping function for the first four data words thereby generated is now executed by way of functional blocks 301, 302, 303, and 304. In a second cycle t=2 the mapping for the next four data words is then constituted using the same functional blocks 301, 302, 303, 304. In a third cycle t=3 the mapping of the next four data words is then accomplished using functional blocks 301, 302, 303, 304. Mapping of the last four data words is then accomplished in a fourth cycle t=4 using functional blocks 301, 302, 303, 304. The output values thereby generated are switched by multiplexer 305 to the output "out", in accordance with the state of the finite state machine, in such a way that the value present at the output "out" corresponds to the result of the mapping of the data word that was produced by bitwise XOR combination of the data word of the block at the input with the correct part of the round key.

The result is that the value of the data word continues to be identified in parallel in four functional blocks 301, 302, 303, 304, and the bitwise XOR combination of the data word at the input with the part of the round key is also executed in parallel. In most cases this is sufficient to allow a successful defense against side-path attacks without requiring too much processor area in order to implement functional blocks 301, 302, 303, 304 and XOR operations. Because of the temporal displacement of the calculation of the respective four data words, it also remains temporally unclear which of the calculations is attributable to the correct part of the round key. Correlating the energy consumption of integrated circuit 300 with the value of the correct part of the round key is thereby made more difficult. Any hypothesis regarding a correct part of the round key becomes so obscured that calculation using the other data words of the 4-bit set also leads to plausible results regarding the possible part of the round key.

FIG. 4 correspondingly shows a procedure in which a memory access to a table mapping the S-box occurs substantially simultaneously for at least two values. As shown in FIG. 4, a processor 401 is provided which retrieves, by way of requests 410, 412, 414, and 416, results of the mapping function that are stored by the S-box in a memory 402, for example as a table. Requests 410, 412, 414, and 416 are effected, for example, using strings "read@baseaddress+{(in⊕sk1), (in⊕sk2), (in⊕sk3), (in⊕sk1)}", "read@baseaddress+{(in⊕sk5), (in⊕sk6), (in⊕sk7), (in⊕sk8)}", "read@baseaddress+{(in⊕sk9), (in⊕sk10), (in⊕sk11), (in⊕sk12)}", "read@baseaddress+{(in⊕sk13), (in⊕sk14), (in⊕sk15), (in⊕sk16)}".

After receiving one of the requests 410, 412, 414, 416, memory 402 correspondingly sends the respectively requested data for the respectively pertinent response 411, 413, 415, and 417 to processor 401. This communication likewise takes place via a data bus (not depicted). FIG. 4 shows the case of PRESENT block encryption that, as described for FIG. 3, uses data words having a four-bit word width. In this case memory access occurs simultaneously for four values. This means that the request occurs starting from the base address as described for FIG. 2, and simultaneously the query occurs for the result of the by the bitwise XOR combination of the data word of the block present at the input with the first four data words associated with a possible round key part. Each response correspondingly contains four possible substitution values.

As depicted in FIG. 4, four responses 411, 413, 415, 417 are thus read out from memory 402 by way of four requests 410 412, 414, and 416. It is not possible to detect, from the energy consumption on the bus that is used for data transfer, which of the requests belongs to the correct round key part. This information thus cannot be unambiguously associated, either in time or within the requests and responses, with the correct part of the round key.

Processor 401 is correspondingly embodied, as described for FIG. 2 and processor 201, to ascertain the correct value from the responses using a procedure described above. This causes each possible value of a part of a round key to be mapped by the nonlinear mapping function for each input value. Each possible hypothesis regarding the round key will therefore appear plausible in the context of a side-channel attack. This means that an attacker will not be capable of discovering the correct hypothesis for the round key.

The totality of the data word associated with the round key, and the further data words, can on the one hand assume all possible values of a data word having the respective word width. On the other hand, the further data words can also be generated by random selection, for example using a random generator provided in the microprocessor. If randomly generated data words are used, it is then possible to dispense with the use of all possible data words. The memory requirement or calculation outlay, or the area requirement on the microprocessor, is thereby also reduced. Testing becomes easier, however, if a random generator is not used.

What is claimed is:

1. A method for providing symmetrical iterated block encryption, the method comprising:
    performing a bitwise XOR combination, via XOR elements of an integrated circuit, of a predetermined data word of a predetermined block with a predetermined key; and
    performing a bitwise XOR combination, via the XOR elements of the integrated circuit, of the predetermined data word with at least one other predetermined data word of a same length as one of the predetermined keys;
    wherein the integrated circuit includes an input that is connected to the XOR elements,
    wherein each of the XOR elements is connected on an output side to at least one of a plurality of function blocks,
    wherein the at least one of the plurality of function blocks is connected on the output side to a multiplexer configured to switch the output of the at least one of the plurality of function blocks to an output of the integrated circuit,
    wherein each of the XOR elements includes a second input at which the predetermined key of the plurality of keys is applied, wherein at least one of the plurality of keys is a current key,
    wherein each substitution box of a plurality of substitution boxes includes n of the function blocks for a given time period.

2. The method as recited in claim 1, further comprising:
    performing, in addition to the bitwise XOR combination of the data word with the predetermined key, a plurality of bitwise XOR combinations of the data word with other data words.

3. The method as recited in claim 2, wherein the totality of the values assumed by the data word of the predetermined key and by the other data words encompasses, at least once, every possible value of a data word having the word width of the predetermined data word.

4. The method as recited in claim 2, wherein only the first and the last rounds of the iterated block encryption method encompass the bitwise XOR combinations of the block with at least one other data word.

5. The method as recited in claim 2, wherein each round of the block encryption method encompasses the bitwise XOR combinations of the predetermined data word of the predetermined block with at least one other data word.

6. The method as recited in claim 2, wherein a value from each of the plurality of the substitution boxes is identified for at least one data word obtained by way of one of the bitwise XOR combinations.

7. The method as recited in claim 6, wherein a plurality of values from the substitution box is identified for a plurality of the data words obtained from the bitwise XOR combinations.

8. The method as recited in claim 7, wherein a value is selected from the plurality of values from the substitution box identified for the plurality of the data words obtained from the bitwise XOR combination of the data word of the predetermined block with the data word of the predetermined key.

9. The method as recited in claim 8, wherein the selected value from the substitution box identified for the bitwise XOR combination of the predetermined block with the predetermined key is used for the block encryption method.

10. The method as recited in claim 2, wherein the identification of the bitwise XOR combination is accomplished successively for at least two of the data words.

11. The method as recited in claim 6, wherein a memory access to a table mapping the substitution box is accomplished substantially simultaneously for at least two values.

12. The method as recited in claim 8, wherein a plurality of functional blocks is provided for mapping a data word identified by one of the bitwise XOR combinations at the input of the respective functional block onto one of the values at the output of the respective functional block by way of the substitution box, the value at the output of the functional block at whose input the bitwise XOR combination of the data word of the predetermined block with the data word of the predetermined key is used being selected from the outputs of the functional blocks for the block encryption method.

13. The method as recited in claim 2, wherein the identification of the bitwise XOR combination is accomplished substantially simultaneously for at least two of the data words.

14. A non-transitory, computer-readable data storage medium storing a computer program having program codes, which is executable on a computer, comprising:
    a program code arrangement having program code for providing symmetrical iterated block encryption, by performing the following:
        performing a bitwise XOR combination, via XOR elements of an integrated circuit, of a predetermined data word of a predetermined block with a predetermined key; and
        performing a bitwise XOR combination, via the XOR elements of the integrated circuit, of the predetermined data word with at least one other predetermined data word of a same length as one of the predetermined keys;
        wherein the integrated circuit includes an input that is connected to the XOR elements,
        wherein each of the XOR elements is connected on an output side to at least one of a plurality of function blocks,
        wherein the at least one of the plurality of function blocks is connected on the output side to a multiplexer configured to switch the output of the at least one of the plurality of function blocks to an output of the integrated circuit,
        wherein each of the XOR elements includes a second input at which the predetermined key of the plurality of keys is applied, wherein at least one of the plurality of keys is a current key,
    wherein each substitution box of a plurality of substitution boxes includes n of the function blocks for a given time period.

* * * * *